United States Patent
Kim et al.

(10) Patent No.: US 10,397,510 B2
(45) Date of Patent: Aug. 27, 2019

(54) ELECTRONIC DEVICES COMPRISING IMAGE SIGNAL PROCESSORS

(71) Applicant: Samsung Electronics Co., Ltd., Suwon-si, Gyeonggi-do (KR)

(72) Inventors: Moo Young Kim, Suwon-si (KR); Kyoungmin Koh, Hwaseong-si (KR); Kyuil Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/921,788

(22) Filed: Mar. 15, 2018

(65) Prior Publication Data

US 2019/0007636 A1    Jan. 3, 2019

(30) Foreign Application Priority Data

Jun. 30, 2017   (KR) .................. 10-2017-0083816

(51) Int. Cl.
| | | |
|---|---|---|
| H04N 5/378 | (2011.01) |
| H04N 5/369 | (2011.01) |
| H04N 5/361 | (2011.01) |
| H04N 5/3745 | (2011.01) |
| H04N 5/367 | (2011.01) |
| H04N 5/357 | (2011.01) |
| H04N 5/365 | (2011.01) |
| H04N 9/04 | (2006.01) |

(52) U.S. Cl.
CPC ........... *H04N 5/378* (2013.01); *H04N 5/3575* (2013.01); *H04N 5/361* (2013.01); *H04N 5/3658* (2013.01); *H04N 5/3675* (2013.01); *H04N 5/36963* (2018.08); *H04N 5/37455* (2013.01); *H04N 9/045* (2013.01)

(58) Field of Classification Search
CPC .... H04N 5/378; H04N 5/361; H04N 5/36963; H04N 5/3658; H04N 5/3575; H04N 5/37455; H04N 5/3675; H04N 9/045
See application file for complete search history.

(56) References Cited

U.S. PATENT DOCUMENTS

| | | |
|---|---|---|
| 7,679,659 B2 | 3/2010 | Kobayashi et al. |
| 7,920,181 B2 | 4/2011 | Kokubo et al. |
| | (Continued) | |

FOREIGN PATENT DOCUMENTS

| | | |
|---|---|---|
| JP | 2009033321 | 2/2009 |
| JP | 2011071709 | 4/2011 |
| | (Continued) | |

*Primary Examiner* — Nhan T Tran
(74) *Attorney, Agent, or Firm* — Myers Bigel, P.A.

(57) ABSTRACT

An electronic device includes an image signal processor and a memory. The image signal processor receives a signal of a first code value that corresponds to an active pixel included in an active area, calculates a correction value based on a second code value associated with a first area and a third code value associated with a second area, and calculates an output code value based on the first code value and the correction value. The first area and the second area are different from the active area. The correction value includes a component of the third code value in proportion to a distance between the active pixel and the first area and includes a component of the second code value in proportion to a distance between the active pixel and the second area.

20 Claims, 7 Drawing Sheets

(56) References Cited

U.S. PATENT DOCUMENTS

| | | | | |
|---|---|---|---|---|
| 8,111,306 B2* | 2/2012 | Kuruma | ............... | H04N 5/3653 |
| | | | | 348/243 |
| 8,355,049 B2 | 1/2013 | Ogasawara et al. | | |
| 8,885,065 B2 | 11/2014 | Lee et al. | | |
| 9,270,909 B2* | 2/2016 | Tsukuda | ................. | H04N 5/361 |
| 2008/0218615 A1* | 9/2008 | Huang | ................. | H04N 5/2176 |
| | | | | 348/294 |
| 2011/0025874 A1* | 2/2011 | Tamaoki | ................. | H04N 5/361 |
| | | | | 348/222.1 |
| 2014/0036118 A1* | 2/2014 | Dowaki | ............... | H04N 5/2173 |
| | | | | 348/294 |
| 2015/0162925 A1* | 6/2015 | Lee | .................... | H03M 1/1295 |
| | | | | 250/208.1 |
| 2015/0304578 A1* | 10/2015 | Okura | ................... | H04N 5/363 |
| | | | | 348/308 |
| 2016/0219229 A1* | 7/2016 | Kimura | ................. | H04N 5/378 |

FOREIGN PATENT DOCUMENTS

| | | |
|---|---|---|
| JP | 4926467 | 5/2012 |
| KR | 100681667 | 2/2007 |
| KR | 100768057 | 10/2007 |
| KR | 101703746 | 2/2017 |

* cited by examiner

ELECTRONIC DEVICES COMPRISING IMAGE SIGNAL PROCESSORS

CROSS-REFERENCE TO RELATED APPLICATION

The present application claims priority under 35 U.S.C. § 119 to Korean Patent Application No. 10-2017-0083816 filed on Jun. 30, 2017 in the Korean Intellectual Property Office, the entire contents of which are hereby incorporated by reference in their entirety for all purposes as if set forth fully herein.

TECHNICAL FIELD

Aspects of the present disclosure relate to electronic devices, and more particularly, relate to image sensors.

BACKGROUND

Nowadays, the relevance of image sensors of camera devices is increasing as mobile devices, digital cameras, and other electronic devices become increasingly popular. An image sensor may sense light by using a photo diode and may output a digital image signal by using an analog to digital converter (ADC). An image sensor may comprise a plurality of pixels for the purpose of sensing light.

Image sensors that operate at higher speeds may be desirable to obtain a high-quality image. Accordingly, a way to provide a plurality of ADCs for simultaneously processing signals transferred from a plurality of pixels has been proposed. Because the a plurality of ADCs may be able to process signals simultaneously, the image sensor may be able to process a digital image signal at a high speed. As a result, a user may obtain high-quality image information.

However, in the case of using the plurality of ADCs together, a noise may occur due to a characteristic difference of the ADCs. Various ways to process a digital image signal are being proposed to reduce a noise.

SUMMARY

Aspects of the present disclosure provide electronic devices configured to remove a horizontal pattern noise.

According to an aspect of the present disclosure, an electronic device comprises an image signal processor. The image signal processor may receive a signal of a first code value corresponding to an active pixel included in an active area, may calculate a correction value based on a second code value associated with a first area and a third code value associated with a second area, and may calculate an output code value based on the first code value and the correction value. The first area and the second area may be different from the active area. The correction value may include a component of the third code value in proportion to a distance between the active pixel and the first area and may include a component of the second code value in proportion to a distance between the active pixel and the second area.

According to an aspect of the present disclosure, an electronic device comprises an image signal processor. The image signal processor may be configured to: calculate an output code value based on a first code value and a correction value; and calculate the correction value based on a second code value and a third code value. The electronic device may comprise a memory configured to store information obtained from the image signal processor. The correction value may be calculated based on a value obtained by multiplying a first coefficient and the third code value together and a value obtained by multiplying a second coefficient and the second code value together. The correction value may be variable based on a divider factor. The first coefficient may increase depending on a distance between a first area and an active pixel of a pixel array, and the second coefficient may increase depending on a distance between a second area and the active pixel of the pixel array.

According to an aspect of the present disclosure, an electronic device comprises an image signal processor. The image signal processor may be configured to: obtain first code values from two or more ADCs; calculate correction values based on a second code value and a third code value obtained from the two or more ADCs; calculate output code values that are corrected based on the first code values and the correction values; and output signals associated with an image based on the output code values. The electronic device further comprises a display configured to output the image based on the signals associated with the image. The output code values may be variable based on a divider factor, and the correction values may be proportional to each of the second code value and the third code value, and may be identically applied to a number of rows that corresponds to the divider factor.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Below, aspects of the present disclosure are described in detail to provide those of ordinary skill in the art an understanding of the inventive concepts provided herein.

Figure 1:
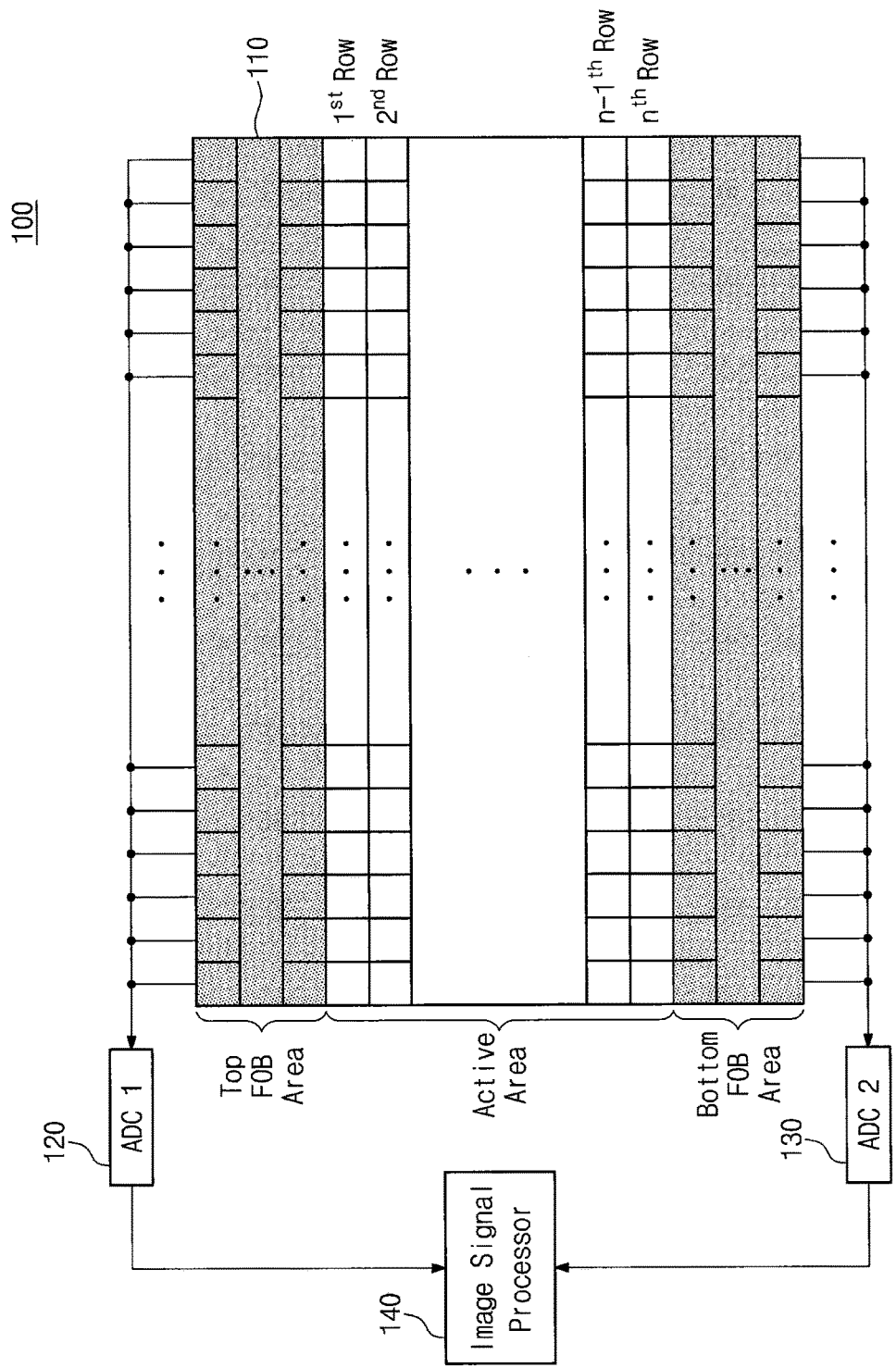
FIG. 1 is a block diagram illustrating an electronic device designed according to aspects of the present disclosure.

FIG. 1 is a block diagram illustrating an electronic device designed according to aspects of the present disclosure.

Referring to FIG. 1, an electronic device 100 may comprise an image sensor (not illustrated), a first ADC 120, a second ADC 130, and an image signal processor 140. Below, the electronic device 100 comprising two ADCs 120 and 130 will be described. However, the present disclosure is not limited thereto, and all embodiments comprising three or more ADCs are within the scope of the present disclosure.

In an example of FIG. 1, the first ADC 120 and the second ADC 130 may obtain code values based on input analog signals. The first ADC 120 and the second ADC 130 may output digital signals associated with the obtained code values. The obtained code values may be associated with specific analog values. The obtained code values may include digital values that are obtained by quantizing the specific analog values. For example, the code values may respectively correspond to specific brightness values of an image to be output by a display. For example, the code values may include an active code value ACT_CODE, a top FOB code value TFOB, a bottom FOB code value BFOB, and an output code value OUT_CODE.

An image sensor may comprise a pixel array 110. The pixel array 110 may comprise a top frame optical black (FOB) area, a bottom FOB area, and an active area. The pixel array 110 may comprise rows of pixels. The top FOB area and the bottom FOB area may be different from the active area.

In the example of FIG. 1, the active area may comprise one or more active pixels. The active area may comprise a pixel array consisting of one or more rows and one or more columns. For example, the active area may comprise first to n-th rows.

The active pixels may output analog signals in response to light. The display may output image information to users based on the analog signals output in response to the light, which is to be described with reference to FIGS. 5 and 8. The active pixels may output analog signals even in a light-blocked environment. For example, the active pixels may output analog signals in response to a dark current and the like. The display may output image information to the users based on analog signals output in response to the dark current and the like. The users may perceive the image output based on the dark current and the like, as a noise.

The first ADC 120 and the second ADC 130 may receive analog signals generated by the active pixels. The first ADC 120 and the second ADC 130 may obtain the active code value ACT_CODE based on input analog signals. The first ADC 120 and the second ADC 130 may output digital signals associated with the active code value ACT_CODE. The active code value ACT_CODE may correspond to the intensity of light received by the active pixels. For example, the obtained active code value ACT_CODE may become greater as the intensity of input light increases. The display may output an image based on the active code value ACT_CODE, which is to be described with reference to FIGS. 5 and 8.

The top FOB area and the bottom FOB area may comprise a light-blocked area. The top FOB area and the bottom FOB area may comprise one or more dark pixels. Each of the top FOB area and the bottom FOB area may comprise one or more rows. The dark pixels may output analog signals in a light-blocked environment. For example, the dark pixels may output analog signals in response to a dark current.

The first ADC 120 and the second ADC 130 may receive analog signals output by the dark pixels. The first ADC 120 and the second ADC 130 may obtain the top FOB code value TFOB and the bottom FOB code value BFOB based on input analog signals, respectively. The first ADC 120 and the second ADC 130 may output digital signals associated with the top FOB code value TFOB and the bottom FOB code value BFOB.

The top FOB code value TFOB and the bottom FOB code value BFOB may correspond to levels of dark currents generated by the dark pixels. For example, the top FOB code value TFOB and the bottom FOB code value BFOB may increase as a level of a generated dark current becomes greater. The top FOB code value TFOB may be associated with the top FOB area, and the bottom FOB code value BFOB may be associated with the bottom FOB area.

For example, the top FOB code value TFOB and the bottom FOB code value BFOB may be used to compensate for a noise due to a dark current. Alternatively, the top FOB code value TFOB and the bottom FOB code value BFOB may be used to compensate for various kinds of noises. For example, the top FOB code value TFOB and the bottom FOB code value BFOB may be used to compensate for a horizontal pattern noise output by a display. A process in which the top FOB code value TFOB and the bottom FOB code value BFOB are used to compensate for noises will be described with reference to FIG. 6.

In an example of FIG. 1, the pixel array 110 may include output terminals (not illustrated) connected to the dark pixels of the top FOB area or the dark pixels of the bottom FOB area. For example, the output terminals may be connected to the dark pixels of the top FOB area. Also, the output terminals may be connected to the dark pixels of the bottom FOB area. The pixels of the pixel array 110 may output analog signals through the output terminals. The first ADC 120 and the second ADC 130 may receive analog signals through the output terminals.

For example, the analog signals may be output through the output terminals connected to the dark pixels of the top FOB area. The first ADC 120 may receive analog signals output through the output terminals connected to the dark pixels of the top FOB area.

Alternatively, the analog signals may be output through the output terminals connected to the dark pixels of the bottom FOB area. The second ADC 130 may receive analog signals output through the output terminals connected to the dark pixels of the bottom FOB area.

The first ADC 120 and the second ADC 130 may output digital signals based on the received analog signals. The output digital signals may be associated with the active code value ACT_CODE, the top FOB code values TFOB, and the bottom FOB code values BFOB.

The image signal processor 140 may receive digital signals associated with the active code values ACT_CODE, the top FOB code values TFOB, and the bottom FOB code values BFOB from the first ADC 120 and the second ADC 130. The received digital signals may be associated with analog signals received from the first ADC 120 and the second ADC 130. The image signal processor 140 may obtain the active code values ACT_CODE, the top FOB code values TFOB, and the bottom FOB code values BFOB from the received digital signals. The image signal processor 140 may process information associated with an image by using the received digital signals.

For example, the image signal processor 140 may calculate output code values OUT_CODE based on the active code values ACT_CODE, the top FOB code values TFOB, and the bottom FOB code values BFOB. The image signal processor 140 may output digital signals associated with an image based on the output code values OUT_CODE. The digital signals output from the image signal processor 140 may be used to provide image information to a user. For example, the output code values OUT_CODE may be associated with brightness of an image output by the display 150.

Figure 2:
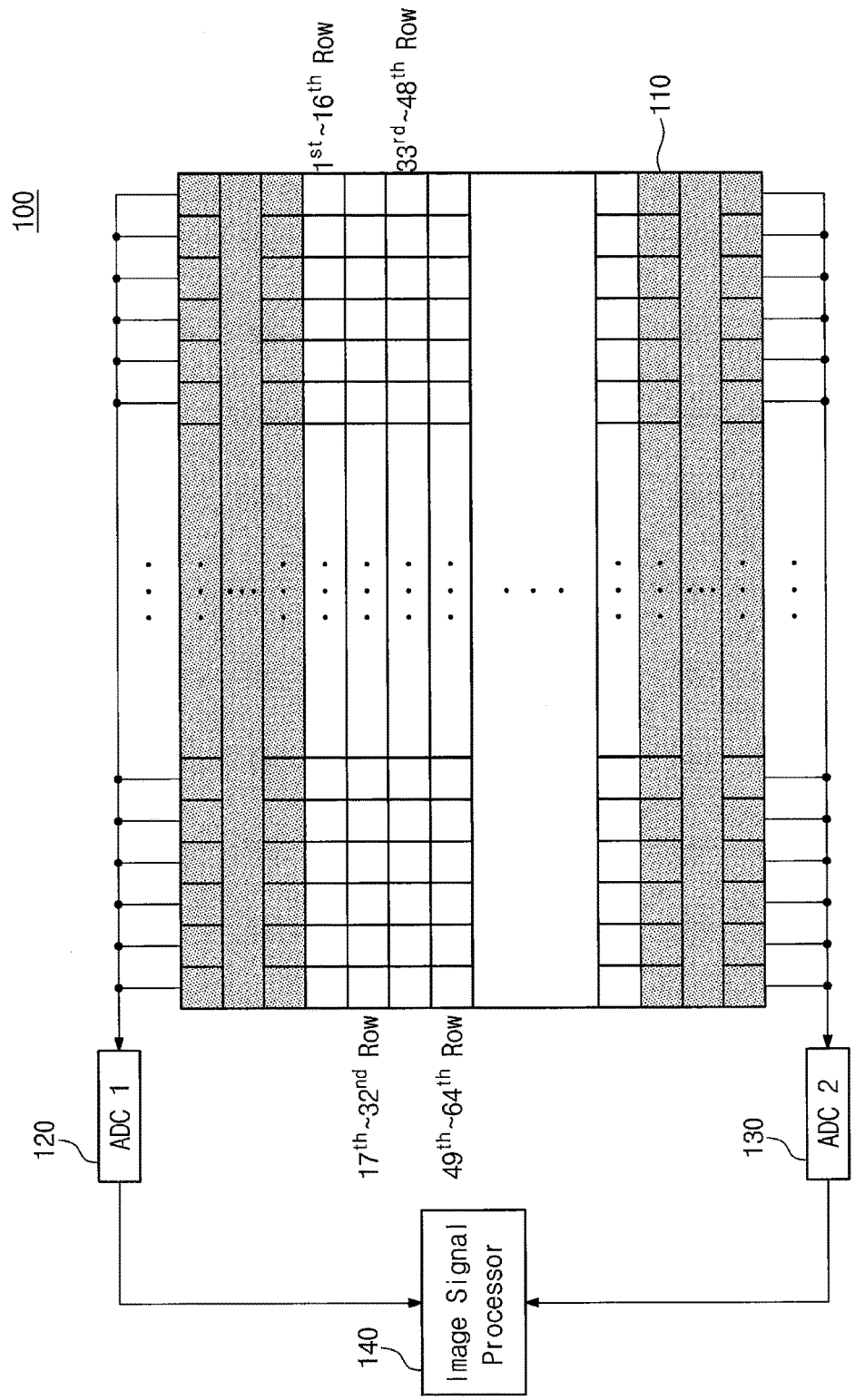
FIG. 2 is a block diagram illustrating the electronic device designed according to aspects of the present disclosure.

FIG. 2 is a block diagram illustrating an electronic device designed according to aspects of the present disclosure.

As described with reference to FIG. 1, the first ADC 120 and the second ADC 130 may receive analog signals from the active pixels comprised in the active area.

In an example of FIG. 2, the first ADC 120 may receive analog signals from the active pixels included in 1st to 16th rows. The first ADC 120 may receive analog signals through the output terminals connected to the top FOB area. The first ADC 120 may output digital signals based on the received analog signals. The first ADC 120 may obtain the active code values ACT_CODE respectively corresponding to the active pixels included in the 1st to 16th rows.

The second ADC 130 may receive analog signals from the active pixels comprised in 17th to 32rd rows. The second ADC 130 may receive analog signals through the output terminals connected to the bottom FOB area. The second ADC 130 may output digital signals based on the received analog signals. The second ADC 130 may obtain the active code values ACT_CODE respectively corresponding to the active pixels comprised in the 17th to 32nd rows.

The first ADC 120 and the second ADC 130 may receive analog signals from the active pixels of the active area in a similar manner. That is, analog signals that are generated at 16 rows disposed continuously may be input to the same ADC. The first ADC 120 or the second ADC 130 may output digital signals based on the received analog signals. The first ADC 120 and the second ADC 130 may obtain the active code values ACT_CODE corresponding to the active pixels, respectively.

In the example of FIG. 2, the active area may comprise a first active area and a second active area. The first active area and the second active area may comprise a plurality of rows adjacent to each other.

For example, the first active area may comprise the 1st to 16th rows and 33rd to 48th rows. The second active area may comprise the 17th to 32nd rows and 49th to 64th rows. The first active area or the second active area may comprise a plurality of adjacent 16 rows depending on a similar manner. In some aspects, the first active area and the second active area may be interlaced.

The pixels of the active area may output analog signals to one of the first ADC 120 and the second ADC 130. For example, the pixels comprised in the first active area may output analog signals to the first ADC 120. The pixels comprised in the second active area may output analog signals to the second ADC 130. Accordingly, the active code value ACT_CODE may be associated with signals input to the first ADC 120 from the first active area and signals input to the second ADC 130 from the second active area.

The first ADC 120 and the second ADC 130 may receive analog signals output from the dark pixels of the top FOB area and the bottom FOB area. The dark pixels of the top FOB area and the bottom FOB area may output the analog signals to one of the first ADC 120 or the second ADC 130. A method in which the dark pixels of the top FOB area and the bottom FOB area output analog signals is similar to a method in which the active pixels of the active area output analog signals, and a description thereof is thus omitted.

However, aspects of the present disclosure may be variously changed or modified such that analog signals are output to one of a plurality of ADCs from pixels of the active area, the top FOB area, and the bottom FOB area. For example, pixels included in "x" adjacent rows disposed continuously may output analog signals to one of the first ADC 120 and the second ADC 130 (here, "x" being a natural number).

The image signal processor 140 may calculate the output code value OUT_CODE with respect to a specific active pixel, based on the active code value ACT_CODE, the top FOB code value TFOB, and the bottom FOB code value BFOB. The image signal processor 140 may output digital signals associated with the output code value OUT_CODE.

The image signal processor 140 may calculate a correction value FADLC1 with respect to a specific active pixel, based on the top FOB code value TFOB and the bottom FOB code value BFOB. The image signal processor 140 may calculate the correction value FADLC1 depending on the following equation 1.

$$FADLC1 = \tfrac{1}{2} \times (TFOB + BFOB) \qquad \text{[Equation 1]}$$

Referring to the equation 1, the correction value FADLC1 may include an arithmetic mean value of the top FOB code value TFOB and the bottom FOB code value BFOB. The correction value FADLC1 may be identically applied to all active pixels of the active area.

The image signal processor 140 may calculate the output code value OUT_CODE by using the active code value ACT_CODE, the correction value FADLC1, and a pedestal dark level PDL as follows. The image signal processor 140 may calculate the output code value OUT_CODE depending on the following equation 2.

$$OUT\_CODE = (ACT\_CODE - FADLC1) + PDL \qquad \text{[Equation 2]}$$

The pedestal dark level PDL may be an offset value for outputting an effective output code value. The effective output code value may be a code value included in a range of a value that is determined by the image signal processor 140. For example, the image signal processor 140 may recognize an output code value having a positive value as the effective output code value.

Referring to the equation 2, the pedestal dark level PDL may increase the output code value OUT_CODE. The output code value OUT_CODE increased by the pedestal dark level PDL may be a positive number. Accordingly, the image signal processor 140 may determine the output code value OUT_CODE as the effective code value. That is, by the pedestal dark level PDL, the output code value OUT_CODE may be included in a range of a value that is recognized by the image signal processor 140 as the effective code value.

As described with reference to FIG. 1, the first ADC 120 may receive analog signals through the output terminals connected to the dark pixels of the top FOB area. The first ADC 120 may receive an analog signal from an active pixel more quickly as the active pixel becomes closer to the top FOB area of the pixel array 110. Accordingly, a settling time of an analog signal input to the first ADC 120 from an active pixel may become shorter as the active pixel becomes closer to the top FOB area of the pixel array 110. For example, the first ADC 120 may receive signals output from active pixels located at a first row more quickly than signals output from active pixels located at a tenth row. Accordingly, settling times of analog signals input to the first ADC 120 may differ from one another depending on locations of rows.

The second ADC 130 may receive analog signals through the output terminals connected to the dark pixels of the bottom FOB area. The second ADC 130 may receive an analog signal from an active pixel more quickly as the active pixel becomes closer to the bottom FOB area of the pixel array 110. Accordingly, a settling time of an analog signal input to the second ADC 130 from an active pixel may become shorter as the active pixel becomes closer to the bottom FOB area of the pixel array 110. For example, the second ADC 130 may receive signals output from active pixels located at 30th row more quickly than signals output from active pixels located at a 20th row. Accordingly, settling times of analog signals input to the second ADC 130 may differ from one another depending on locations of rows.

The first ADC 120 and the second ADC 130 may obtain code values based on analog signals received depending on different settling times. The display may output image information to users based on the obtained code values, which is to be described with reference to FIGS. 5 and 8. The image provided by the display may include a noise having a horizontal pattern, which is to be described with reference to FIG. 5.

Figure 3:
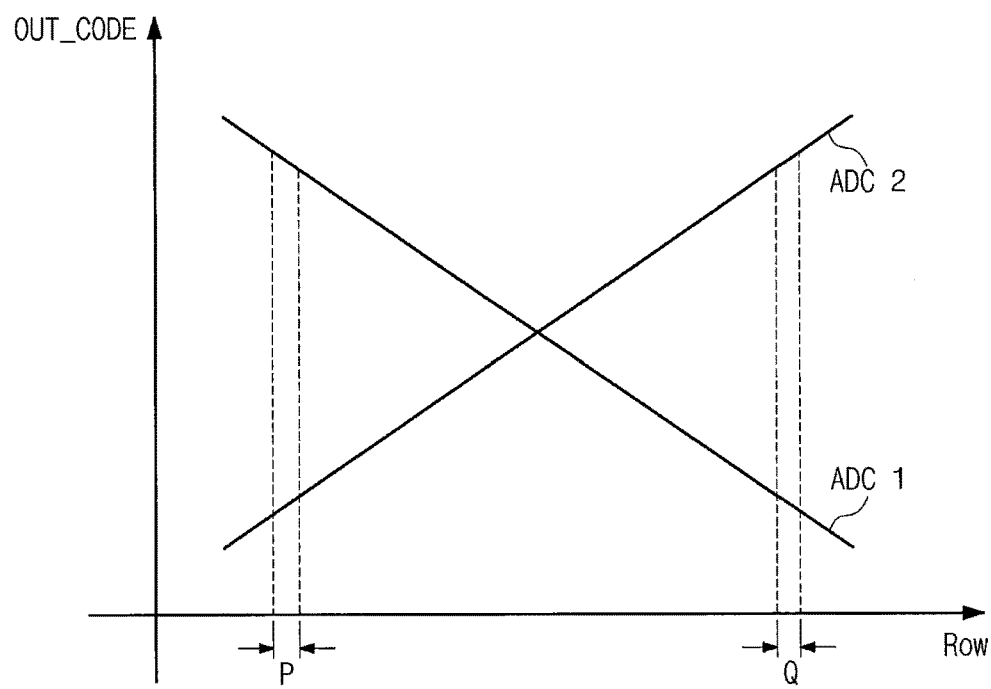
FIG. 3 is a graph illustrating an example of output code value calculated by an image signal processor.

FIG. 3 is a graph illustrating an example of output code value calculated by an image signal processor.

In an example of FIG. 3, an x-axis represents a number of a row located in an active area. A row number may mean a number allocated depending on a location of a row located in the active area. For example, a row number allocated to a row may become smaller as a distance of the row from the top FOB area decreases. Also, a y-axis represents the output code value OUT_CODE. A graph of FIG. 3 may be a graph in which the output code values OUT_CODE associated with row numbers are discrete.

In the example of FIG. 3, all active pixels of the pixel array 110 may output analog signals in response to light of a uniform intensity, and the output code values OUT_CODE may be calculated based on the analog signals.

The image signal processor 140 may calculate the output code value OUT_CODE depending on the equation 1 and the equation 2. In the example of FIG. 3, all active pixels of the pixel array 110 may output analog signals in response to light of a uniform intensity, and the output code values OUT_CODE may be calculated based on the analog signals. A graph of FIG. 3 may be a graph illustrating the output code values OUT_CODE associated with discrete row numbers.

Referring to the graph of FIG. 3, with regard to the first ADC 120, the output code value OUT_CODE may become greater as a row number corresponding to the output code value OUT_CODE becomes smaller.

As described with reference to FIG. 2, the first ADC 120 may receive an analog signal from an active pixel more quickly as the active pixel becomes closer to the top FOB area of the pixel array 110. Accordingly, a level of an analog signal received by the first ADC 120 within a specific time may decrease as a row number increases. The output code value OUT_CODE corresponding to the received analog signal may decrease as a level of the received analog signal decreases. Accordingly, the output code value OUT_CODE associated with a row number may decrease at a constant ratio.

Referring to the graph of FIG. 3, with regard to the second ADC 130, the output code value OUT_CODE may become greater as a row number corresponding to the output code value OUT_CODE becomes greater.

As described with reference to FIG. 2, the second ADC 130 may receive an analog signal from an active pixel more quickly as the active pixel becomes closer to the bottom FOB area of the pixel array 110. Accordingly, a level of an analog signal received by the second ADC 130 within a specific time may increase as a row number increases. The output code value OUT_CODE corresponding to the received analog signal may increase as a level of the received analog signal increases. Accordingly, the output code value OUT_CODE associated with a row number may increase at a constant ratio.

In an area represented in the graph, the output code value OUT_CODE calculated based on an output signal of the first ADC 120 and the output code value OUT_CODE calculated based on an output signal of the second ADC 130 may be different.

For example, with regard to pixels located in an area "P", the output code value OUT_CODE calculated based on an output signal of the first ADC 120 may be greater than the output code value OUT_CODE calculated based on an output signal of the second ADC 130. With regard to pixels located in an area "Q", the output code value OUT_CODE calculated based on an output signal of the second ADC 130 may be greater than the output code value OUT_CODE calculated based on an output signal of the first ADC 120.

In the case where the output code values OUT_CODE calculated are different in a specific area, an image associated with the output code values OUT_CODE may include a noise of a horizontal pattern.

For example, with regard to the area "P", an image corresponding to pixels outputting analog signals to the first ADC 120 may have a greater brightness value than an image corresponding to pixels outputting analog signals to the second ADC 130.

For example, with regard to the area "Q", an image corresponding to pixels outputting analog signals to the second ADC 130 may have a greater brightness value than an image corresponding to pixels outputting analog signals to the first ADC 120.

For example, referring to FIG. 2, an image associated with the 1st to 16th rows may have a greater brightness value than an image associated with the 17th to 32rd rows.

Figure 4:
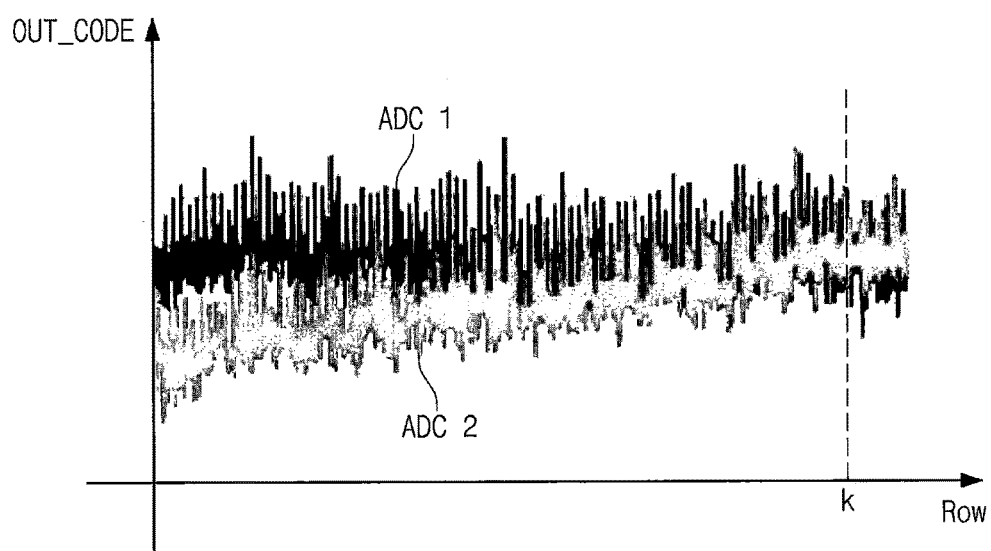
FIG. 4 is a graph illustrating an example of output code value calculated by the image signal processor.

FIG. 4 is a graph illustrating an example of output code value calculated by an image signal processor.

In an example of FIG. 4, an x-axis represents a number of a row located in an active area. Also, a y-axis represents the output code value OUT_CODE. For example, the output code value OUT_CODE may be calculated depending on the equation 1 and the equation 2. A graph of FIG. 4 may be a graph in which the output code values OUT_CODE associated with row numbers are discrete.

In the example of FIG. 4, all active pixels of the pixel array 110 may output analog signals in response to light of a uniform intensity, and the output code values OUT_CODE may be calculated based on the analog signals.

Referring to FIG. 4, with regard to 1 st to k-th rows (k being a natural number of 2 or more), the output code value OUT_CODE calculated based on an output signal of the first ADC 120 and the output code value OUT_CODE calculated based on an output signal of the second ADC 130 may be different. Accordingly, an image associated with the output code value OUT_CODE may include a horizontal pattern noise.

Figure 5:
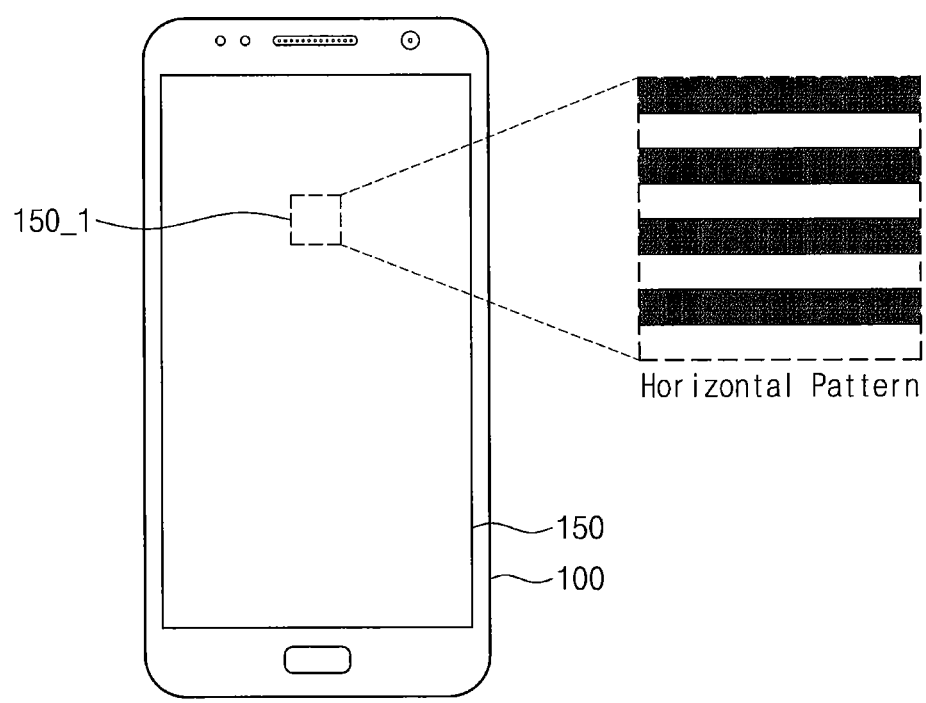
FIG. 5 is a conceptual diagram illustrating an example of image associated with an output code value of FIG. 4.

FIG. 5 is a conceptual diagram illustrating an example of image associated with an output code value of FIG. 4.

Referring to FIG. 5, the electronic device 100 may include the display 150. The display 150 may output an image based on signals output by the image signal processor 140. For example, the electronic device 100 may output an image corresponding to the output code values OUT_CODE illustrated in FIG. 4.

The output code values OUT_CODE may correspond to brightness values of images output by the display 150 respectively. For example, a brightness value corresponding to the output code value OUT_CODE may become smaller as the output code value OUT_CODE becomes smaller. A brightness value corresponding to the output code value OUT_CODE may become greater as the output code value OUT_CODE becomes greater. An image output by the display 150 may include images having different brightness values. Referring to FIG. 5, an image output in an area 150_1 may include an image of a horizontal pattern, which includes shaded images and non-shaded images. The non-shaded images may have a brightness value greater than the shaded images.

For example, the area 150_1 may be included in the area "P" of FIG. 3. The non-shaded images may be an image associated with code values obtained by the first ADC 120. The shaded images may be an image associated with code values obtained by the second ADC 130.

For example, the area 150_1 may be included in the area "Q" of FIG. 3. Non-shaded areas may be an image associated with code values obtained by the second ADC 130. Shaded areas may be an image associated with code values obtained by the first ADC 120.

Figure 6:
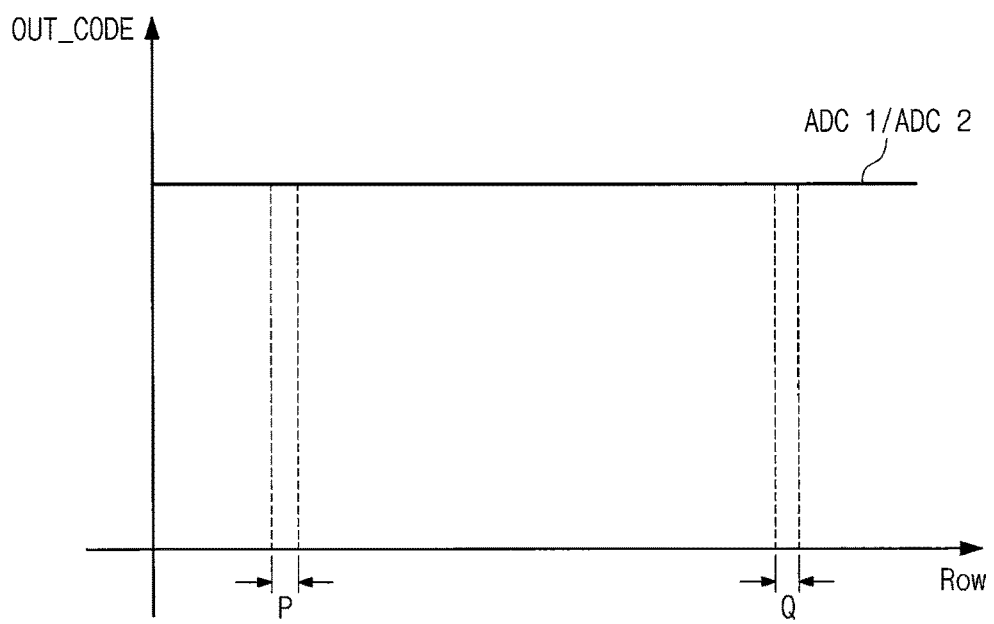
FIG. 6 is a graph illustrating an exemplary output code value calculated by an image signal processor.

FIG. 6 is a graph illustrating an example of output code value calculated by an image signal processor.

In an example of FIG. 6, an x-axis represents a number of a row located in an active area. Also, a y-axis represents the output code value OUT_CODE. A graph of FIG. 6 may be a graph in which the output code values OUT_CODE associated with row numbers are discrete.

In the example of FIG. 6, all active pixels of the pixel array 110 may output analog signals in response to light of a uniform intensity, and the output code values OUT_CODE may be calculated based on the analog signals.

Referring to FIG. 2, the image signal processor 140 may calculate a correction value FADLC2 based on the top FOB code value TFOB and the bottom FOB code value BFOB. The image signal processor 140 may calculate the correction value FADLC2 depending on the following equation 3.

$$FADLC2 = TFOB - \frac{int\left(\frac{j-1}{DF}\right)}{\frac{n}{DF}} \times (TFOB - BFOB) \quad \text{[Equation 3]}$$

In the equation 3, "j" may mean a row number. Here, "j" may be a natural number of 2 or more. The correction value FADLC2 may correspond to an active pixel located at a j-th row. In the examples of FIGS. 1 and 2, the row number "j" may be proportional to a distance between the top FOB area and the j-th row. However, the row number "j" may be associated with a distance between another area and a j-th row of the pixel array 110 and is not limited by the following description. In another embodiment, the row number "j" may be proportional to a distance between the j-th row and the bottom FOB area.

Here, "n" may mean the number of rows included in the active area. A divider factor DF may be a natural number that is determined arbitrarily by a designer. The number of operations performed by the image signal processor 140 may decrease as a value of the divider factor DF becomes greater. For example, the divider factor DF may be associated with the operation ability of the image signal processor 140.

int $$\left(\frac{j-1}{DF}\right)$$

may mean an integer portion of $$\frac{j-1}{DF}.$$

That is, int $$\left(\frac{j-1}{DF}\right)$$

may mean a quotient of (j−1) divided by the divider factor DF. For example, in the case where the row number "j" is "3140" and the divider factor DF is 16, int $$\left(\frac{j-1}{DF}\right)$$

may be "189". The equation 3 may be reorganized as the following equation 4.

$$FADLC2 = \left[1 - \frac{int\left(\frac{j-1}{DF}\right)}{\frac{n}{DF}}\right] \times TFOB + \frac{int\left(\frac{j-1}{DF}\right)}{\frac{n}{DF}} \times BFOB \quad \text{[Equation 4]}$$

Referring to the equation 4, the correction value FADLC2 may be proportional to each of the top FOB code value TFOB and the bottom FOB code value BFOB. In detail, the correction value FADLC2 may decrease in proportion to the top FOB code value TFOB. The correction value FADLC2 may increase in proportion to the bottom FOB code value BFOB.

In the equation 4, a first coefficient may be $$\left(\frac{int\left(\frac{j-1}{DF}\right)}{\frac{n}{DF}}\right).$$

Also, a second coefficient may be $$\left[1 - \frac{int\left(\frac{j-1}{DF}\right)}{\frac{n}{DF}}\right].$$

The correction value FADLC2 may be proportional to each of the first coefficient and the second coefficient. In detail, the correction value FADLC2 may increase in proportion to the first coefficient and the second coefficient. The correction value FADLC2 may be calculated by a product of the first coefficient and the bottom FOB code value BFOB and a product of the second coefficient and the top FOB code value TFOB.

The first coefficient and the second coefficient may be proportional to int $$\left(\frac{j-1}{DF}\right).$$

In detail, the first coefficient may increase in proportion to int $$\left(\frac{j-1}{DF}\right),$$

and the second coefficient may decrease in proportion to int $$\left(\frac{j-1}{DF}\right),$$

The first coefficient may increase as the row number "j" increases. Accordingly, the first coefficient may increase depending on a distance between the top FOB area and an active pixel. Referring to the equation 4, the correction value FADLC2 may include a bottom FOB code value (BFOB) component that increases in proportion to the row number "j".

The second coefficient may decrease as the row number "j" increases. Accordingly, the second coefficient may decrease depending on a distance between the top FOB area and an active pixel. Alternatively, the second coefficient may increase depending on a distance between the bottom FOB area and an active pixel. Referring to the equation 4, the correction value FADLC2 may include a top FOB code value (TFOB) component that decreases in proportion to the row number "j".

$$\frac{int\left(\frac{j-1}{DF}\right)}{\frac{n}{DF}}$$

of the first coefficient and the second coefficient may be variable depending on the divider factor DF. Accordingly, the correction value FADLC2 may be variable depending on the divider factor DF.

The first coefficient and the second coefficient may be identically calculated with respect to at least two of a plurality of rows. Accordingly, the correction value FADLC2 may be identically calculated with respect to at least two of a plurality of rows. For example, the correction value FADLC2 may be identically calculated with respect to rows, the number of which corresponds to the divider factor DF. In the case where the divider factor DF "16", int $$\left(\frac{j-1}{DF}\right)$$

may be identically calculated with respect to 16 rows. Accordingly, the correction value FADLC2 may be identically calculated with respect to specific 16 rows.

For example, in the case where the divider factor DF is "1", the image signal processor 140 may calculate different correction values FADLC2 with respect to rows comprised in the active area. In the case where the divider factor DF is "1", the correction value FADLC2 may be calculated by the following equation 5.

$$FADLC2 = TFOB - \frac{int(j-1)}{n} \times (TFOB - BFOB) \quad \text{[Equation 5]}$$

In the examples of FIGS. 1 and 2, the row number "j" may be proportional to a distance between the top FOB area and the j-th row. However, the row number "j" may be associated with a distance between another area and a j-th row of the pixel array 110 and is not limited to the examples of FIGS. 1 and 2. In another embodiment, the row number "j" may be proportional to a distance between the j-th row and the bottom FOB area.

Referring to the equation 3 and the equation 5, as an active pixel becomes closer to the top FOB area, a top FOB code value (TFOB) component included in the correction value FADLC2 corresponding to the active pixel may increase. As an active pixel becomes closer to the bottom FOB area, a bottom FOB code value (BFOB) component included in the correction value FADLC2 corresponding to the active pixel may increase. The correction value FADLC2 may include the bottom FOB code value (BFOB) component in proportion to a distance between the top FOB area and an active pixel. Also, the correction value FADLC2 may include the top FOB code value (TFOB) component in proportion to a distance between the bottom FOB area and an active pixel.

The image signal processor 140 may calculate the output code value OUT_CODE corrected based on the active code value ACT_CODE, the correction value FADLC2, and the pedestal dark level PDL as follows.

$$OUT\_CODE=(ACT\_CODE-FADLC2)+PDL \quad \text{[Equation 6]}$$

As described with reference to the equation 4, the correction value FADLC2 may be identically calculated with respect to at least two of a plurality of rows. Accordingly, the output code value OUT_CODE may be identically calculated with respect to at least two of the plurality of rows.

Continuing to refer to FIG. 6, in an area illustrated in the graph, the output code value OUT_CODE calculated based on an output signal of the first ADC 120 and the output code value OUT_CODE calculated based on an output signal of the second ADC 130 may be uniform. As understood from a comparison of FIGS. 3 and 6, the output code value OUT_CODE calculated based on the correction value FADLC2 may be more uniform than the output code value OUT_CODE calculated based on the correction value FADLC1.

Two graphs are illustrated in FIG. 6 as being the same, but the output code values OUT_CODE corresponding to the two graphs may have similar values.

For example, with regard to pixels located in the area "P", the output code values OUT_CODE calculated based on an output signal of the first ADC 120 may be similar to the output code values OUT_CODE calculated based on an output signal of the second ADC 130. With regard to pixels located in the area "Q", the output code values OUT_CODE calculated based on an output signal of the second ADC 130 may be similar to the output code values OUT_CODE calculated based on an output signal of the first ADC 120. Accordingly, in the area illustrated in the graph of FIG. 6, an image associated with the output code values OUT_CODE may not include a horizontal pattern noise.

Figure 7:
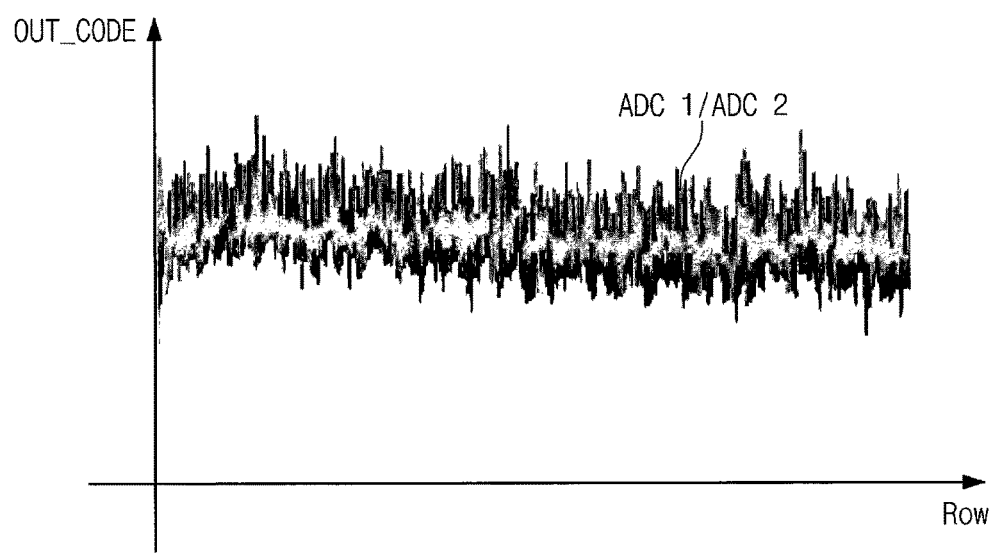
FIG. 7 is a graph illustrating an example of output code value calculated by an image signal processor.

FIG. 7 is a graph illustrating an example of output code value calculated by an image signal processor.

In an example of FIG. 7, an x-axis represents a number of a row located in an active area. Also, a y-axis represents the output code value OUT_CODE. For example, the output code value OUT_CODE may be calculated depending on the equation 3 and the equation 6. A graph of FIG. 7 may be a graph in which the output code values OUT_CODE associated with row numbers are discrete.

In the example of FIG. 7, all active pixels of the pixel array 110 may output analog signals in response to light of a uniform intensity, and the output code values OUT_CODE may be calculated based on the analog signals.

Referring to FIG. 7, in an area illustrated in the graph, the output code value OUT_CODE calculated based on an output signal of the first ADC 120 and the output code value OUT_CODE calculated based on an output signal of the second ADC 130 may be uniform. The output code value OUT_CODE calculated based on an output signal of the first ADC 120 may be similar to the output code value OUT_CODE calculated based on an output signal of the second ADC 130. Accordingly, in the area illustrated in the graph of FIG. 7, an image associated with the output code values OUT_CODE may not include a horizontal pattern noise.

Figure 8:
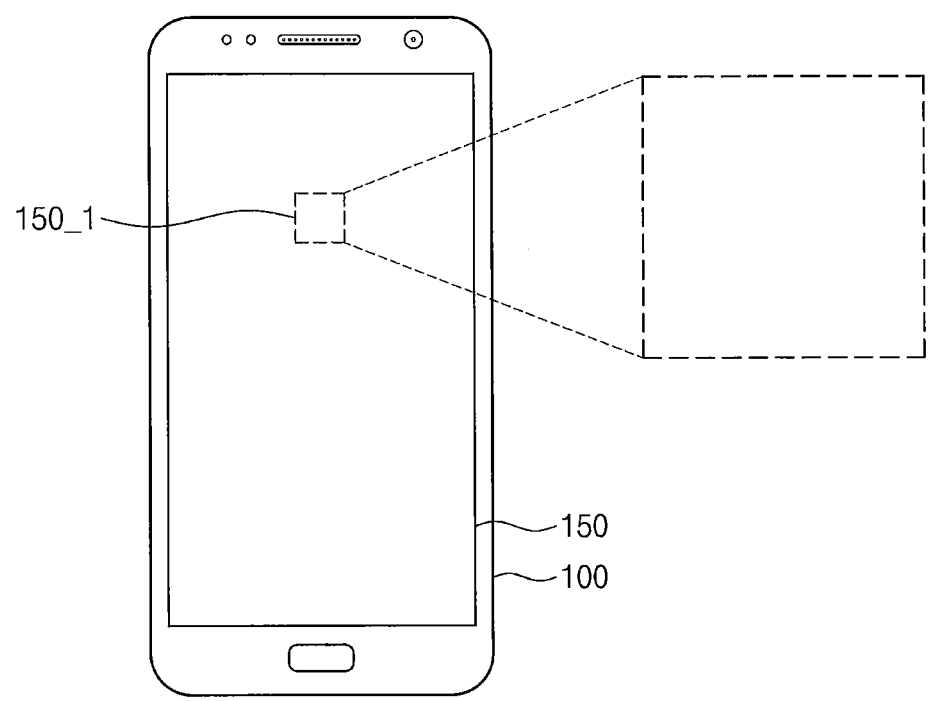
FIG. 8 is a conceptual diagram illustrating an example of image associated with an output code value of FIG. 7.

FIG. 8 is a conceptual diagram illustrating an example of image associated with an output code value of FIG. 7.

Referring to FIG. 8, the electronic device 100 may comprise the display 150. The display 150 may output an image based on signals output by the image signal processor 140. For example, the display 150 may output an image corresponding to the output code values OUT_CODE illustrated in FIG. 7.

In an example of FIG. 8, the display 150 may output images of uniform brightness values. As understood from a comparison of FIGS. 5 and 8, an image output in the area 150_1 of FIG. 8 may have a uniform brightness value compared with an image output in the area 150_1 of FIG. 5. Accordingly, an image output in the area 150_1 of FIG. 8 may not include a horizontal pattern noise. For example, the area 150_1 may be included in the area "P" of FIG. 6. Alternatively, the area 150_1 may be included in the area "Q" of FIG. 6.

Figure 9:
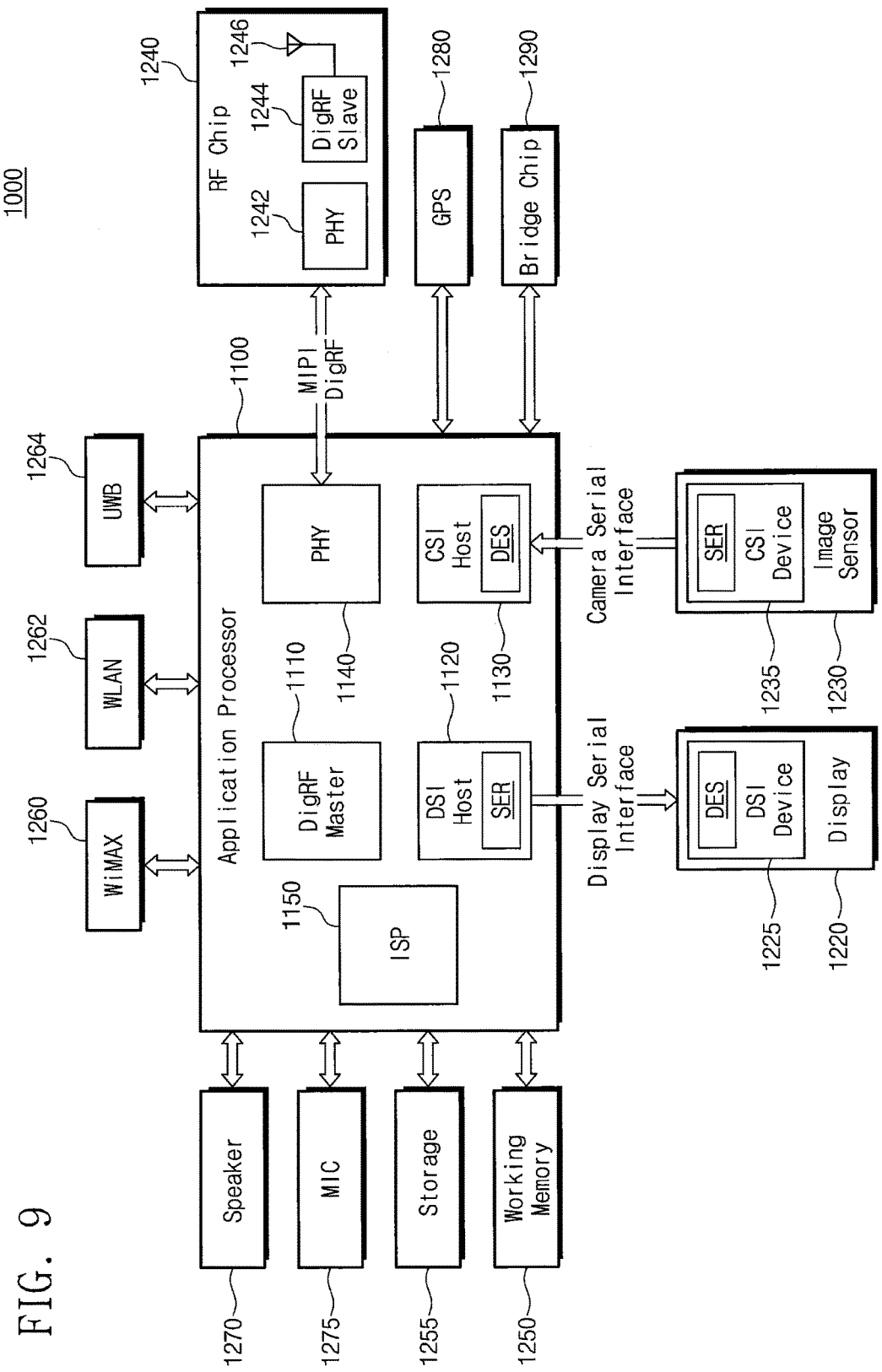
FIG. 9 is a block diagram illustrating the electronic device designed according to aspects of the present disclosure.

FIG. 9 is a block diagram illustrating an electronic device designed according to aspects of the present disclosure.

An electronic device 1000 may be implemented with a data processing device that is able to use or support an interface protocol proposed by the MIPI alliance. For example, the electronic device 1000 may be one of electronic devices such as a portable communication terminal, a personal digital assistant (PDA), a portable media player (PMP), a smartphone, a tablet computer, and a wearable device. The electronic device 1000 may include the electronic device 100 of FIGS. 1, 2, 5, and 8.

The electronic device 1000 may comprise an application processor 1100, a display 1220, and an image sensor 1230. The application processor 1100 may comprise a DigRF master 1110, a display serial interface (DSI) host 1120, a camera serial interface (CSI) host 1130, a physical layer 1140, and an image signal processor (ISP) 1150.

The DSI host 1120 may communicate with a DSI device 1225 of the display 1220 through the DSI. For example, a serializer SER may be implemented in the DSI host 1120, and a deserializer DES may be implemented in the DSI device 1225.

The CSI host 1130 may communicate with a CSI device 1235 of the image sensor 1230 through the CSI. For example, a deserializer DES may be implemented in the CSI host 1130, and a serializer SER may be implemented in the CSI device 1235.

The image sensor 1230 may comprise the pixel array 110 of FIGS. 1 and 2. The image sensor 1230 may output signals output from pixels comprised in the pixel array to ADCs (not illustrated). The ADCs may comprise the first ADC 120 and the second ADC 130 of FIGS. 1 and 2. The image sensor 1230 may output analog signals in response to light. The image sensor 1230 may output analog signals associated with the active code value ACT_CODE, the top FOB code value TFOB, and the bottom FOB code value BFOB. The image sensor 1230 may comprise electronic circuits for controlling an operation of the pixels.

The ISP 1150 may comprise the image signal processor 140 of FIGS. 1 and 2. The ISP 1150 may be disposed inside or outside the application processor 1100. The ISP 1150 may comprise a separate memory (not illustrated) for storing data associated with an image. The memory may be disposed inside or outside the ISP 1150.

For example, the ISP 1150 may process signals received from pixels included in the pixel array 110 of FIGS. 1 and 2. The ISP 1150 may calculate the output code values OUT_CODE based on the received signals. The ISP 1150 may output digital signals associated with the calculated output code values OUT_CODE. For example, the ISP 1150 may calculate the correction value FADLC2 depending on the equation 3 and the equation 5. For example, the ISP 1150 may perform calculation according to the equation 6 for the purpose of calculating the output code value OUT_CODE.

The separate memory disposed inside or outside the ISP 1150 may store data processed or to be processed by the ISP 1150. The memory may store information obtained from the ISP 1150. For example, the information obtained from the ISP 1150 may include information associated with a top FOB code value, a bottom FOB code value, a correction value, and an active code value.

Alternatively, the memory may store the divider factor DF. The ISP 1150 may obtain the divider factor DF from the memory. The memory may receive a signal from the ISP 1150 for the purpose of storing information. The memory may output a signal to the ISP 1150 for the purpose of transferring the stored information to the ISP 1150.

In the case where the correction value FADLC2 is calculated by the ISP 1150 depending on the equation 3 and the equation 5, the memory may store the correction value FADLC2 and a value associated with the correction value FADLC2. In the case where the output code value OUT_CODE is calculated by the ISP 1150 depending on the equation 6, the memory may store the output code value OUT_CODE and a value associated with the output code value OUT_CODE.

The electronic device 1000 may further comprise a working memory 1250 and storage 1255. The working memory 1250 may temporarily store data processed or to be processed by the application processor 1100. The working memory 1250 may comprise a volatile memory such as a static random access memory (SRAM), a dynamic RAM (DRAM), or a synchronous DRAM (SDRAM), and/or a nonvolatile memory such as a flash memory, a phase-change RAM (PRAM), a magneto-resistive RAM (MRAM), a resistive RAM (ReRAM), or a ferro-electric RAM (FRAM).

The storage 1255 may store data provided from the application processor 1100 or may provide the stored data to the application processor 1100. The storage 1255 may comprise a nonvolatile memory that is able to store data regardless of whether power is supplied thereto. The storage 1255 may store information associated with data processed by the image signal processor 140 of FIGS. 1 and 2.

The display 1220 may comprise the display 150 of FIG. 8. The display 1220 may provide a user with information associated with an image, based on a digital signal output by the ISP 1150. For example, the digital signal output by the ISP 1150 may be associated with an image output by the display 1120. Referring to FIG. 8, an image output by the display 1220 may not include a horizontal pattern noise.

An image provided to the user by the display 1220 may have a brightness value. The brightness value of the image output by the display 1220 may correspond to a code value associated with a digital signal output by the ISP 1150. For example, the display 1220 may output an image of a brightness value corresponding to the output code value OUT_CODE calculated depending on the equation 6.

The electronic device 1000 may further comprise a radio frequency (RF) chip 1240 that communicates with the application processor 1100. The RF chip 1240 may comprise a physical layer 1242, a DigRF slave 1244, and an antenna 1246. For example, the physical layer 1242 of the RF chip 1240 and the physical layer 1140 of the application processor 1100 may exchange data with one another through DigRF interface proposed by the MIPI alliance.

The electronic device 1000 may communicate with an external device/system through communication modules, such as a worldwide interoperability for microwave access (WiMAX) 1260, a wireless local area network (WLAN) 1262, and an ultra-wideband (UWB) 1264. The electronic device 1000 may further comprise a speaker 1270 and a microphone 1275, which are used to process voice information. The electronic device 1000 may further comprise a global positioning system (GPS) device 1280 for processing position information. The electronic device 1000 may further comprise a bridge chip 1290 for managing connection with peripheral devices.

According to aspects of the present disclosure, an image of an improved image quality may be output.

While the inventive concepts have been described herein with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An electronic device comprising:
   an image signal processor configured to:
   receive a signal of a first code value corresponding to an active pixel included in an active area;
   calculate a correction value based on a second code value associated with a first area and a third code value associated with a second area; and
   calculate an output code value based on the first code value and the correction value,
   wherein the first area and the second area are different from the active area, and
   wherein the correction value includes a component of the third code value in proportion to a distance between the active pixel and the first area and includes a component of the second code value in proportion to a distance between the active pixel and the second area.

2. The electronic device of claim 1, wherein the image signal processor calculates the output code value based on the first code value, the correction value, and an offset value, and
   wherein the output code value is included in a range of a value determined by the image signal processor due to the offset value.

3. The electronic device of claim 1, wherein the image signal processor receives a digital signal from two or more analog to digital converters (ADCs), and
   wherein the digital signal corresponds to an analog signal input to the two or more ADCs from pixels of the first area, the second area, and the active area.

4. The electronic device of claim 1, wherein the active area, the first area, and the second area are included in a pixel array,
   wherein the pixel array includes a plurality of rows,
   wherein the image signal processor is configured to calculate output code values for each row of the plurality of rows, and
   wherein ones of the output code values calculated with respect to at least two of the plurality of rows are identical.

5. The electronic device of claim 1, further comprising:
   a memory configured to store information obtained from the image signal processor.

6. The electronic device of claim 5, wherein the information obtained from the image signal processor includes the first code value, the second code value, the third code value, and the correction value.

7. The electronic device of claim 1, further comprising:
   a display configured to provide information associated with an image based on a digital signal output from the image signal processor.

8. The electronic device of claim 7, wherein the display is configured to output an image of a brightness value corresponding to the output code value.

9. The electronic device of claim 1, wherein the first area and the second area include a light-blocked area, and
   wherein the active pixel is configured to output a signal in response to light.

10. The electronic device of claim 1, wherein the image signal processor receives a digital signal from a first ADC and a second ADC,
    wherein the active area includes a first active area and a second active area, and
    wherein the first code value is associated with a signal input to the first ADC from the first active area and with a signal input to the second ADC from the second active area.

11. The electronic device of claim 10, wherein the first active area and the second active area each include a plurality of rows adjacent to one another.

12. An electronic device comprising:
    an image signal processor configured to:
    calculate an output code value based on a first code value and a correction value; and
    calculate the correction value based on a second code value and a third code value, and
    a memory configured to store information obtained from the image signal processor,
    wherein the correction value is calculated based on a value obtained by multiplying a first coefficient and the third code value together and a value obtained by multiplying a second coefficient and the second code value together, wherein the correction value is variable based on a divider factor, wherein the first coefficient increases based on a distance between a first area and an active pixel of a pixel array, and wherein the second coefficient increases based on a distance between a second area and the active pixel of the pixel array.

13. The electronic device of claim 12, wherein the divider factor is associated with an operation ability of the image signal processor.

14. The electronic device of claim 12, wherein the active pixel is disposed in a row, wherein the first coefficient increases in proportion to a quotient of a number value of the row, divided by the divider factor, wherein the second coefficient decreases in proportion to the quotient of the number value of the row divided by the divider factor, and wherein the number value of the row is proportional to a distance between the first area and the active pixel.

15. The electronic device of claim 12, further comprising:
two or more different ADCs configured to output a digital signal associated with the first code value, the second code value, and the third code value.

16. The electronic device of claim 12, wherein the memory is configured to store the correction value and a value associated with the correction value.

17. An electronic device comprising:
an image signal processor configured to:
    obtain first code values from two or more ADCs;
    calculate correction values based on a second code value and a third code value obtained from the two or more ADCs;
    calculate output code values that are corrected based on the first code values and the correction values; and
    output signals associated with an image based on the output code values; and
a display configured to output the image based on the signals associated with the image, wherein the output code values are variable based on a divider factor, and wherein the correction values are proportional to each of the second code value and the third code value, and are identically applied to a number of rows that corresponds to the divider factor.

18. The electronic device of claim 17, further comprising:
a memory configured to store the divider factor,
wherein the divider factor is associated with an operation ability of the image signal processor.

19. The electronic device of claim 17, further comprising:
an image sensor including a pixel array,
wherein the pixel array includes rows, and
wherein each of the correction values includes a component of the third code value that increases in proportion to a value associated with a location of a corresponding row included in the pixel array.

20. The electronic device of claim 19, wherein
wherein each of the correction values includes a component of the second code value that decreases in proportion to the value associated with the location of the corresponding row included in the pixel array.

* * * * *